United States Patent
Steinle et al.

(10) Patent No.: US 11,526,331 B2
(45) Date of Patent: Dec. 13, 2022

(54) APPARATUS AND METHOD FOR GENERATING AT LEAST ONE RANDOM NUMBER, USE OF AN OPTICAL PARAMETRIC OSCILLATOR

(71) Applicants: UNIVERSITAT STUTTGART, Stuttgart (DE); MAX-PLANCK-GESELLSCHAFT ZUR FÖRDERUNG DER WISSENSCHAFTEN E.V., Munich (DE)

(72) Inventors: Tobias Steinle, Stuttgart (DE); Ilja Gerhardt, Zurich (CH); Johannes Nikolaus Greiner, Stuttgart (DE); Harald Giessen, Marnheim (DE)

(73) Assignees: UNIVERSITAT STUTTGART, Stuttgart (DE); MAX-PLANCK-GESELLSCHAFT ZUR FORDERUNG DER WISSENSCHAFTEN E.V., Munich (DE)

(*) Notice: Subject to any disclaimer, the term of this patent is extended or adjusted under 35 U.S.C. 154(b) by 154 days.

(21) Appl. No.: 16/760,290

(22) PCT Filed: Oct. 30, 2017

(86) PCT No.: PCT/EP2017/001268
§ 371 (c)(1),
(2) Date: Apr. 29, 2020

(87) PCT Pub. No.: WO2019/086093
PCT Pub. Date: May 9, 2019

(65) Prior Publication Data
US 2020/0257502 A1 Aug. 13, 2020

(51) Int. Cl.
G06F 7/58 (2006.01)
G02F 1/39 (2006.01)
H01S 3/108 (2006.01)

(52) U.S. Cl.
CPC ........... G06F 7/588 (2013.01); G02F 1/39 (2013.01); H01S 3/1083 (2013.01); *G02F 1/392* (2021.01); *G02F 2203/15* (2013.01)

(58) Field of Classification Search
CPC ........ G02F 1/39; G02F 1/392; G02F 2203/15; H01S 3/1083; G06F 7/588
See application file for complete search history.

(56) References Cited

U.S. PATENT DOCUMENTS 9,423,819 B2 * 8/2016 Marandi .............. B82Y 10/00
9,735,536 B2 8/2017 Giessen et al.
2014/0016168 A1 1/2014 Marandi et al.

FOREIGN PATENT DOCUMENTS

EP 3064992 9/2016
JP 2004280019 A * 10/2004 ............... G02F 1/39

OTHER PUBLICATIONS

Marandi, et al., "All-optical quantum random bit generation from intrinsically binary phase of parametric oscillators," 2012 Optical Society of America, vol. 20, No. 17, Aug. 8, 2012, Optics Express, pp. 19322-19330.

(Continued)

*Primary Examiner* — Daniel Petkovsek
(74) *Attorney, Agent, or Firm* — Medler Ferro Woodhouse & Mills PLLC

(57) ABSTRACT

An apparatus and a corresponding method for generating at least one random number are disclosed. The apparatus includes an optical parametric oscillator being pumped by a pump signal with a predetermined pump power and a predetermined pump frequency. The optical parametric oscillator is configured to operate in a period multiplication (Continued)

state for providing an oscillator output signal of alternating light pulses, the oscillator output signal having a period that is N-times the period of the pump signal, where N is an integer and N>1. The apparatus also includes a comparing unit being configured to compare the output signal with a reference signal, wherein the reference signal has a frequency that is 1/N of the predetermined pump frequency, and an evaluation unit being configured to generate the at least one random number based on the comparison of the output signal with the reference signal.

20 Claims, 5 Drawing Sheets

(56) References Cited

OTHER PUBLICATIONS

Written Opinion of International Search Authority, Application No. PCT/EP2017/001268.
International Search Report, Application No. PCT/EP2017/001268.
Herrero-Collantes et al., "Quantum Random Number Generators", Apr. 13, 2016.

\* cited by examiner

APPARATUS AND METHOD FOR GENERATING AT LEAST ONE RANDOM NUMBER, USE OF AN OPTICAL PARAMETRIC OSCILLATOR

The present invention relates to an apparatus and a method for generating one or more random numbers. Moreover, the present invention relates to the use of an optical parametric oscillator for generating one or more random numbers.

The generation of random numbers or random bits is of enormous importance in modern information science. Cryptographic security is based on random numbers which require a physical process for their generation. In particular, random numbers are necessary in the field of cryptography for encryption algorithm, in simulation techniques, for gambling and for similar applications.

Random numbers are commonly provided by hardware random number generators. However, these exhibit often a number of problems, namely experimental bias, memory in the system, and other technical subtleties, which reduce the reliability in the entropy estimation. Further, the generated outcome has to be post-processed to "iron out" such spurious effects.

Conventional random number generators do not inherently generate unpredictable random numbers. They are either based on algorithms and thus referred to as pseudo random number generators (PRNG), which are deterministic, or on hardware implementations (so called True Random Number Generators, TRNG), for which the unpredictable nature cannot be proved. For TRNG, chaotic systems or systems with many unknown parameters are used so that the process of generating random numbers cannot be reconstructed by means of currently available knowledge. However, in the future it may be possible to predict the random numbers of such systems. Electrical components used for conventional random number generators result in additional noise compared to mere optical systems. Thus, the main problem of TRNGs is the lack of provableness of their unpredictable nature.

This fundamental problem of TRNGs can be solved by random number generators (QRNG) that are based on quantum mechanical processes. According to the present understanding of quantum mechanics, all relevant properties and parameters may be known but their measurement results may nevertheless be inherently random. Conventional QRNG are based on the following quantum mechanical effects:
  arrival time of individual photons or extenuated light pulses with low intensity,
  path information of individual photons or extenuated light pulses with low intensity,
  measurement of vacuum fluctuations, and
  entanglement and violation of deterministic Bell-inequations.

Mere optical approaches are preferred compared to approaches based on electrical circuits in view of speed, power losses, heat generation and wiring. However, present optical QRNG approaches have the following drawbacks:
  The measured parameters are not unambiguously binary or no integers and thus have to be further processed;
  An unbalance in the distribution of random numbers has to be corrected by extensive further processing;
  The quantum mechanical origin of generated random numbers is often insufficiently or not at all proved;
  Instead of individual photons, extenuated light pulses with low intensity are often used so that the individual photon character cannot be explicitly proved;
  The optical detection of photons or light pulses with low intensity generates additional noise and ambiguity in the generation of random numbers;
  Up to now, QRNGs that are based on the violation of deterministic Bell-inequations produce random numbers with a very low rate.

Furthermore, there exist approaches that use an optical parametric oscillator (OPO).

For example:
  A "twin OPO" comprising two independent, identical and degenerated OPOs, combined in one resonator. Random bits are extracted via an asymmetric stabilized Michelson-interferometer which determines the relative phase difference of the two OPOs.
  An OPO being operated by two pump lasers and for which the output power of one of the two lasers is modulated by means of an additional acousto-optical-modulator (AOM). The resulting interference signal is detected by an asymmetric Mach-Zehnder-interferometer.

However, conventional available OPO approaches have the following drawbacks:
  The OPO has to be operated in a degenerate state with phase-sensitive amplification. This requires additional stability mechanisms. Either an active interferometric stabilized resonator is necessary or the resonator lengths has to be varied periodically by means of mechanical and algorithmic processes. Thereby, additional noise is produced.
  Some approaches need several synchronized OPOs and/or interferometric detection mechanisms. In particular, stabilization mechanisms with sub-micrometer precision are necessary.

It is thus an object of the present invention to provide an enhanced apparatus and method for generating one or more random numbers or random bits, which reduces the further processing of the generated random numbers to a minimum. In particular, the random numbers shall be true random numbers, i.e., they shall not be predictable. Further, the random numbers shall have an equal distribution and shall pass empirical tests such as the NIST Test Suite etc., which approve the principle capability of the generated random numbers for applications. This object is solved according to the invention by the features of the independent claims. Preferred embodiments of the invention are defined in the dependent claims.

According to one aspect of the present invention, an apparatus for generating at least one random number is provided. The apparatus comprises:
  an optical parametric oscillator being pumped by a pump signal with a predetermined pump power and a predetermined pump frequency, the optical parametric oscillator being configured to operate in a period multiplication state for providing an oscillator output signal of alternating light pulses, the oscillator output signal having a period that is N-times the period of the pump signal, where N is an integer and N>1;
  a comparing unit being configured to compare the output signal with a reference signal, wherein the reference signal has a frequency that is 1/N of the predetermined pump frequency; and
  an evaluation unit being configured to generate the at least one random number based on the comparison of the output signal with the reference signal.

A random number may be a random bit, i.e. a "0" or "1". A random number may alternatively be a binary number comprising a plurality of bits and preferably representing an integer.

The apparatus for generating at least one random number (random number generator) comprises an optical parametric oscillator which is pumped by a pump signal with a predetermined pump frequency or repetition rate. The optical parametric oscillator may use a linear resonator design or a ring resonator design. The pump signal may be provided by a pump light source and particularly by a pump laser. The pump light source may be part of the optical parametric oscillator and/or the random number generator. The optical parametric oscillator is configured or prepared to be operable or to operate in a so-called period multiplication state, also referred to as a multiple period state or a "PN-state". The PN-state relates to a modulation of the optical parametric oscillator according to which the oscillator output signal has a period that is N-times the period of the pump signal. N is an integer that is larger than 1, e.g. 2, 3, 4, 5, 6, etc. Preferably, N=2. The P2-state is a bi-stable state and/or an equilibrated state of the optical parametric oscillator. That is, the P2-state is characterized by a bi-modal behavior. The operating state of the optical parametric oscillator can be varied or adjusted by the pump power of the pump light source. That is, the optical parametric oscillator is configured to be operable in the PN-state, particularly in the P2-state, based on the pump power. In other words, the PN-state and particularly the P2-state can be achieved by applying a pump signal having a predetermined pump power that brings the optical parametric oscillator into the PN-state, particularly into the P2-state.

The so-called period multiplication, and in particular the period doubling, is a nonlinear phenomenon. A light pulse, that circulates and/or oscillates in the OPO, changes its shape or form (i.e., its energy, pulse form, spectral form) multiple times and resumes the original pulse form only after exactly N, particularly two, cycles. This is in contrast to most available optical systems for which the original pulse form is usually reproduced after exact one cycle. The consequence of operating the OPO in the PN-state and particularly in the P2-state is that one and the same resonator delivers an alternating pulse train in a perfectly stable operational mode. The pulse train particularly alternates in the pulse energy.

The optical parametric oscillator according to the present invention provides an oscillator output signal, particularly a pulse train, of alternating light pulses. Alternating light pulses in the sense of the present invention are light pulses with alternating pulse energy. That is, consecutive pulses have different pulse energies, while each integer multiple of the Nth-pulse essentially has the same pulse energy. For example, in case of a P2-state, consecutive pulses have different pulse energies, while "next but one"-pulses essentially have the same pulse energy. This results in a period of the output signal being N-times the period of the pump signal. In case of the P2-state, this results in a period of the output signal being twice of the period of the pump signal. In other words, the frequency of the periodic output signal is 1/N of the frequency of the pump signal. In case of the P2-state, the frequency of the periodic output signal is half of the frequency of the pump signal.

In EP 3 064 992 A1 and U.S. Pat. No. 9,735,536 B2, which are hereby incorporated by reference, an optical parametric oscillator which can be operated in a PN-state and thus be used according to the present invention is described. In particular, as disclosed in EP 3 064 992 A1 and U.S. Pat. No. 9,735,536 B2, the optical parametric oscillator may be realized by an optical system for the provision of at least one high-frequency modulated light pulse, comprising:

a pump light source configured to provide high-frequency pump light pulses;

an optical resonator having a coupling element configured for coupling the high-frequency pump light pulses into the resonator and a decoupling element for decoupling at least one high-frequency modulated light pulse from the resonator and an optically non-linear frequency conversion medium arranged in the resonator for transforming the pump light pulses in each case into first and second conversion light pulses and one residual pump light pulse;

wherein the resonator comprises a feedback arm for at least one of the first and second conversion light pulses and/or the residual pump light pulse, wherein an optically non-linear feedback medium is arranged for the optical modulation of at least one of the first conversion light pulse, the second conversion light pulse, and the residual pump light pulse.

The optical parametric oscillator may be pumped synchronously by the pump light pulses and generate the two conversion light pulses as a signal pulse and an idler pulse. A non-linear phase shift of at least one of the first conversion light pulses, the second conversion light pulse, and the residual pump light pulse in the feedback medium may be adjusted to an attractor of the optical system. Exactly one of the three following pulses may be optically modulated in the feedback arm: the signal pulse, the idler pulse, or the residual pump light pulse. The optical modulation of the pulse modulated in the feedback arm may bring about a correlating modulation of the other two of the above-mentioned pulses. The pump light source may be configured to provide the high-frequency pump light pulses with a repetition rate of at least 1 MHz. The high-frequency modulated light pulse that is decoupled from the resonator may include at least one of the first conversion light pulse, the second conversion light pulse, or the residual pump light pulse. The pump light source may initially provide high-frequency output light pulses, which are divided by a beam splitter into the high-frequency pump light pulses for coupling into the resonator on the one hand, and into high-frequency reference light pulses on the other hand.

The optical parametric oscillator may be configured for providing the high-frequency reference light pulses such that they correlate with the high-frequency modulated light pulses. The high-frequency reference light pulses and the high-frequency modulated light pulses may be designed and envisioned as Stokes pulses and pumped pulses in a Raman microscope. The optical parametric oscillator may have an output adjustment device for adjusting the output of the pump light pulses that are coupled into the resonator. A decoupling coefficient of the decoupling element may be adjustable. The decoupling element may be designed and arranged such that the residual pump light pulse and the first conversion light pulse are completely decoupled, while the second conversion light pulse is at least partly deflected into the feedback arm. The feedback arm may be designed as a separate feedback arm, which is spatially separated from a resonator arm of the resonator, in which the frequency conversion medium is arranged. The provided high-frequency light pulse may be modulated exclusively in an optical fashion.

The optically non-linear feedback medium may be configured for the purely passive and purely optical modulation of the at least one conversion light pulse and/or the residual pump light pulse. Exactly one of the three following pulses may be optically modulated in the feedback arm: the first conversion light pulse, wherein the first conversion light pulse is a signal pulse; the second conversion light pulse, wherein the second conversion light pulse is an idler pulse; or the residual pump light pulse. The optical modulation of one of the three above-mentioned pulses may bring about a correlating modulation of the other two of the above-mentioned pulses.

The optical parametric oscillator may comprise an extended cavity configuration, i.e., a cavity or resonator that supports a plurality of simultaneous pulses. In other words, an extended cavity configuration is a cavity or a resonator, in which a plurality of oscillator output signals can be generated simultaneously. Thereby, a simultaneous generation of a plurality of random numbers is possible. In particular, the extended cavity configuration relates to a cavity or resonator of the OPO with a length corresponding to a multiple M with respect to the pump laser's resonator length. In other words, the length of the cavity or resonator of the OPO is M times the length of the resonator of the pump laser, where M is a positive number, particularly a positive integer. Thereby, a simultaneous oscillation of M pulses and thus a simultaneous generation of M random numbers is possible. Alternatively or in addition, spectral or wavelength-multiplexing may be used to achieve a simultaneous generation of random numbers. By means of spectral or wavelength-multiplexing, multiple pulses having different wavelengths can be generated in the OPO. These pulses can be spectrally separated in the cavity or resonator of the OPO. The evaluation of the output signal of the OPO can then also be carried out in dependence on the used wavelength, e.g., by using a corresponding spectral filter. Thus, in other words, for the simultaneous generation of random numbers, a temporally multiplexing or a spectral multiplexing may be used. In particular, the multiplexing may be realized:

(a) by generating multiple pulses temporally separated in the cavity or resonator of the OPO (temporal multiplexing), wherein the cavity length of the OPO particularly corresponds to M times the cavity length of the pump light source or pump laser, and/or (b) by generating multiple pulses having different wavelengths, wherein the pulses with different wavelengths are spectrally separated in the cavity or resonator of the OPO (spectral multiplexing).

The evaluation unit of the random number generator may comprise a microprocessor and/or a computer.

The random number generator according to the present invention is capable to distinguish unambiguously between two binary states. Thereby, a further processing of the generated random numbers or bits is reduced to a minimum. In particular, in case of utilizing the P2-state, the unambiguous assignment of the output, i.e., the measuring results, of the optical parametric oscillator to binary random numbers is based on the binary character of the period doubling state. Thus, the generated random numbers according to the present invention are advantageously unaffected from optical detection processes which are a substantial limitation in the practical implementation of many conventional optical RNGs. Compared to OPOs operated in the degenerated state, the sensitivity with respect to environmental conditions is drastically reduced and the operation significantly simpler. Also, contrary to many conventional optical methods, according to the present invention there is no need of an interferometric detection of a phase encoded signal. Moreover, the generation of random numbers according to the present invention is based on quantum mechanical effects, particularly when generating an initial pulse in the optical parametric oscillator. This implies that the generated random numbers can be understood to be true random numbers which cannot be predicted. This further reduces a further processing of the generated random numbers. A bit stream generated by the present invention resembles a perfect coin toss and passes all relevant randomness measures.

Further, the generation of random numbers by an OPO has the following advantages compared to conventional solutions: the speed of an optical generator, its equi-energetic bistability, as well as a demodulator-based and ambiguity-free measurement principle. The term "ambiguity-free" refers to a measurement which has two (or more) definite outcomes, which cannot be confused due to technical issues of the measurement apparatus. In a conventional quantum randomness generation with single photon detectors, such ambiguities can occur for example due to dead-times, electrical jitter and varying detection efficiencies.

In a preferred embodiment, the comparing unit comprises or is a phase determination unit. The comparing unit or phase determination unit may comprise, e.g., a Lock-in amplifier, a demodulator, a radio frequency mixer and/or a gated-integration. The phase determination unit is configured to determine a phase, particularly a relative phase or a phase difference, of the oscillator output signal with respect to the reference signal. The evaluation unit is configured to generate the at least one random number based on the determined phase. Preferably, the evaluation unit is configured to generate a "0" (0-bit) or a "1" (1-bit) depending on whether the determined phase is below or above a threshold value. The threshold value may be set as zero phase. The "0" or "1" may be the random number to be generated. Alternatively, the "0" or "1" may be a part of the random number to be generated, i.e. a part of a bit string representing the random number to be generated. The comparing unit may emit the random sequence directly into an e.g. TTL level output.

In a further preferred embodiment, the oscillator output signal is a pulse train of alternating high and low pulses, and wherein the evaluation unit is configured to generate a "1" (1-bit) or a "0" (0-bit) depending on whether the high pulses or the low pulses of the oscillator output signal are synchronous with pulses of the reference signal. In other words, the evaluation unit is configured to generate a "1" (1-bit) or a "0" (0-bit) depending on whether either the high pulses or the low pulses of the oscillator output signal are clocked with pulses of the reference signal.

In a further preferred embodiment, the random number generator further comprises switching means, particularly optical switching means, being configured to switch on and off the optical parametric oscillator. The switching means is preferably comprised and/or arranged in a resonator of the OPO and may comprise a chopper, an acousto-optical modulator (AOM), an electro-optical modulator (EOM), particularly a fiber-optic electro-optical modulator, and/or a saturable absorber. Alternatively or in addition, the switching means may be configured to modulate and/or switch on and off the pump signal. Preferably, the switching means is configured to disturb or interrupt a light pulse, such as the pump pulse and preferably a light pulse within the resonator of the OPO, particularly an initial pulse or a seed pulse. In particular, the switching means is configured to inhibit a running or an oscillating pulse in the OPO, wherein the switching means is preferably arranged or disposed within the OPO, particularly within the cavity or resonator of the OPO. By switching on and off the OPO, random numbers or random bits can be generated continuously. In other words, a plurality of random numbers or random bits can be generated.

In a further preferred embodiment, the random number generator further comprises trigger means for providing a trigger signal, wherein the comparing unit is configured to compare the oscillator output signal with the reference signal in response to the trigger signal. In other words, the comparing unit is configured to compare the oscillator output signal with the reference signal upon or based on the trigger signal.

In particular, the phase determination unit is configured to determine the phase of the oscillator output signal with respect to the reference signal in response to the trigger signal. Preferably, the trigger means is coupled with the switching means. In particular, the trigger means comprises or is the switching means. By means of the trigger signal, it can be ensured that the OPO operates in the PN-state when comparing the oscillator output signal with the reference signal.

In a further preferred embodiment, the trigger means is configured to provide an on-state trigger signal during an on-state of the optical parametric oscillator, wherein the on-state of the optical parametric oscillator relates to the period multiplication state of the optical parametric oscillator. By means of the on-state trigger signal, a toss measurement can be performed. A toss measurement in the sense of the present invention is a measurement based on which a random number or a random bit can be generated. In particular, a toss measurement relates to a comparison of the oscillator output signal with the reference signal when the OPO is in the PN-state. Preferably, a toss measurement relates to a phase determination of the oscillator output signal with respect to the reference signal when the OPO is in the PN-state.

In a further preferred embodiment, the trigger means is configured to provide an off-state trigger signal during an off-state of the optical parametric oscillator. The off-state relates to a state in which the OPO does not generate an output signal or in which the output of the OPO is zero. By means of the off-state trigger signal, a control measurement can be performed. A control measurement in the sense of the present invention is a measurement that performs a comparison of the oscillator output signal with the reference signal when the OPO is switched off. Preferably, a control measurement relates to a phase determination of the oscillator output signal with respect to the reference signal when the OPO is switched off. By means of the control measurement it can be verified that two subsequent measurements do not carry spurious information from one to the next outcome.

In a further preferred embodiment, the random number generator further comprises a reference signal generator configured to provide or generate the reference signal.

Preferably the reference signal is generated based on the pump signal, particularly by dividing the frequency or the repetition rate of the pump signal by N. Thus, the reference signal generator may be a frequency divider for dividing the frequency of the pump signal by N. Dividing the frequency may be achieved by any suitable method or device, e.g. by electrical or optical means or by means of a software counter.

According to a further aspect of the present invention, a method for generating at least one random number or at least one random bit is provided. The method comprises the following steps:

providing an optical parametric oscillator being pumped by a pump signal with a predetermined pump power and a predetermined pump frequency, the optical parametric oscillator being configured to operate in a period multiplication state for providing an oscillator output signal of alternating light pulses;

operating the optical parametric oscillator in the period multiplication state;

comparing the oscillator output signal with a reference signal, wherein the reference signal has a frequency that is half of the predetermined pump frequency; and generating the at least one random number based on the comparison of the oscillator output signal with the reference signal.

In particular, the method comprises the steps of:

providing an apparatus according to the present invention;

operating the optical parametric oscillator in the period multiplication state;

comparing the oscillator output signal with the reference signal; and generating the at least one random number based on the comparison of the oscillator output signal with the reference signal.

Operating the optical parametric oscillator in the period multiplication (particularly doubling) state may comprise pumping the optical parametric oscillator with a pump pulse having a pump power that brings the optical parametric oscillator into the PN-state (particularly P2-state).

In a preferred embodiment, comparing the oscillator output signal with the reference signal comprises determining a phase of the oscillator output signal with respect to the reference signal, wherein the at least one random number is generated based on the determined phase, and wherein generating the at least one random number preferably comprises generating a 0-bit or a 1-bit depending on whether the determined phase is below or above a threshold value.

In a further preferred embodiment, the oscillator output signal is a pulse train of alternating high and low pulses and generating the at least one random number comprises generating a 1-bit or a 0-bit depending on whether the high pulses or the low pulses of the oscillator output signal are synchronous or clocked with pulses of the reference signal.

In a further preferred embodiment, the method comprises the step of switching on (and off) the optical parametric oscillator and performing at least one toss measurement by comparing the oscillator output signal with the reference signal upon having switched on the optical parametric oscillator. In other words, the toss measurement is performed by determining a toss phase of the oscillator output signal with respect to the reference signal. In particular, the switching on and off of the OPO is performed continuously depending on how many random numbers shall be generated. Thus, preferably, the switching on and off of the OPO is performed as long and often as necessary to generate a distinct number of random numbers or bits.

In a further preferred embodiment, the method comprises the step of switching on and off the optical parametric oscillator and performing at least one control measurement by comparing the oscillator output signal with the reference signal upon having switched off the optical parametric oscillator. In other words, the control measurement is performed by determining a control phase of the oscillator output signal with respect to the reference signal.

In a further preferred embodiment, the method comprises the steps of:

switching on and off the optical parametric oscillator for a predetermined number of times;

performing a corresponding number of toss measurements by comparing the oscillator output signal with the reference signal upon each switching-on step; and
generating a corresponding number of random numbers or random bits based on the comparisons of the oscillator output signal with the reference signal.

In particular, an initial pulse, also referred to as an initial seed, is generated in the OPO by means of parametric fluorescence, as described as follows: First, the OPO is off. The off-state of the OPO may be achieved by actively blocking a resonator of the OPO, e.g. by means of an optical chopper, an AOM, an EOM or a saturable absorber. Then, at a predetermined time, this blockage is set aside so that a transient process of the OPO is initialized. Thereby, the initial pulse is generated in the optically non-linear frequency conversion medium or gain medium of the OPO by optical parametric generation (OPG), also known as "parametric fluorescence" or "parametric superfluorescence". The properties of this initial pulse are determined by vacuum fluctuations inside the gain medium and by the pump pulse. The contribution of the vacuum fluctuations ensures that for each repetition of this step an individual or different initial pulse is generated. The individual initial pulses may differ in energy, optical spectra, temporal pulse form and/or optical phase. The initial pulse finally determines the oscillator output signal and particularly the phase of the oscillator output signal with respect to the reference signal. If, for example, the OPO is operated in the P2-state, only two possible phases or phase differences can occur. Thus, the generated random numbers are based on vacuum fluctuations which cannot be predicted.

If, for example, the OPO is operated in the P2-state, each transient effect of the OPO inevitably converges in an alternating pulse train, namely either HLHLH . . . ("high-low-high-low-high . . . ") or LHLHL . . . ("low-high-low-high-low . . . "). The initial pulse determines which of these sequences results.

After one of these two sequences has established, this sequence remains stored as "optical bit" in the period multiplication (particularly doubling) OPO. In principle, such a storing is possible for a time period of hours to days. However, in order to generate the next random bit, it may be desired to electronically read out the optical bit as fast as possible and to restart the procedure for generating a next random bit.

In case of operating the OPO in the P2-state, the pulse sequences "HLHLH" and "LHLHL" can be distinguished by means of the reference signal. This reference signal can easily be generated by electronically dividing, particularly halving, the fundamental frequency or repetition rate of the OPO, i.e., by multiplying, particularly doubling, the periodicity of the OPO. For example, in case of operating the OPO in the P2-state, the reference signal can be provided reading out the pump light source. In the simplest case, it can be checked whether for a given pulse sequence the high or low pulses are clocked with the reference signal so that the pulse sequence can be unambiguously associated with a "0" or "1". As already mentioned above, the evaluation can be performed by means of a Lock-in amplifier, a demodulator, a radio frequency mixer, a gated-integration or by means of other electronic devices and procedures.

The method for generating at least one random number may thus comprise one or more of the following steps:
generating a seed pulse in the OPO by parametric fluorescence;
optically reading out the seed pulse by means of period multiplication, particularly by means of period doubling;
optically storing a pulse sequence as output by the OPO; and
electronically reading out the stored pulse sequence.

A further aspect of the present invention relates to the use of an optical parametric oscillator for generating at least one random number or at least one random bit, wherein the optical parametric oscillator is operated in a period multiplication state, particularly in a period doubling state, in order to generate the at least one random number or the at least one random bit. In particular, the further aspect of the present invention relates to the use of an optical parametric oscillator for generating at least one random number by performing the method according to the present invention.

In particular, according to the present invention, the effect of period multiplication, e.g. period doubling, is advantageously used for a mere optical read-out of a seed pulse in an OPO and a temporary storage of a random number based on the seed pulse in the OPO. An electronic read-out of the random number is performed by means of an electronic or optical reference signal. The reference signal can easily be provided by the pump light source or the pump signal of the OPO.

For the above mentioned further independent aspects and in particular for preferred embodiments in this regard, the explanations given above or below concerning the embodiments of the first aspect also hold true. In particular, for one independent aspect of the present invention and for preferred embodiments in this regard, the explanations given above and below concerning the embodiments of the respective other aspects also hold true.

Individual embodiments for solving the problem are described by way of example below with reference to the figures. In this case, the individual embodiments described have in part features which are not absolutely necessary for implementing the claimed subject matter, but which provide desired properties in specific applications. In this regard embodiments which do not have all the features of the embodiments described below are also intended to be regarded as disclosed in a manner coming under the technical teaching described. Furthermore, in order to avoid unnecessary repetitions, specific features are mentioned only with regard to individual embodiments from among the embodiments described below. It is pointed out that the individual embodiments are therefore intended to be considered not only by themselves but also in a joint consideration. On the basis of this joint consideration the person skilled in the art will recognize that individual embodiments can also be modified by inclusion of individual or a plurality of features of other embodiments. It is pointed out that a systematic combination of the individual embodiments with individual or a plurality of features described with regard to other embodiments may be desirable and expedient and is therefore intended to be taken into account and also to be regarded as encompassed by the description.

BRIEF DESCRIPTION OF THE FIGURES

The above and other objects, features and advantages of the present invention will become more apparent upon reading of the following description of preferred embodiments and accompanying drawings. Other features and advantages of the subject-matter described herein will be apparent from the description and the drawings and from the claims. It should be understood that even though embodiments are separately described, single features and functionalities thereof may be combined without prejudice to additional embodiments. The present disclosure is illustrated by way of example and not limited by the accompanying figures.

Preferred embodiments of the present invention are exemplarily described regarding the following figures:

FIG. 6c shows a schematic representation of an exemplary pump signal, exemplary reference signal, exemplary OPO output signal and exemplary trigger signal according to a measured transient scheme of the random number generator of FIG. 6a;

DETAILED DESCRIPTION OF THE FIGURES

The following detailed description relates to exemplary embodiments of the present invention. Other embodiments of the invention are possible within the scope of the invention as defined by the appended claims. Throughout the figures, same reference signs are used for the same or similar elements.

Figure 1:
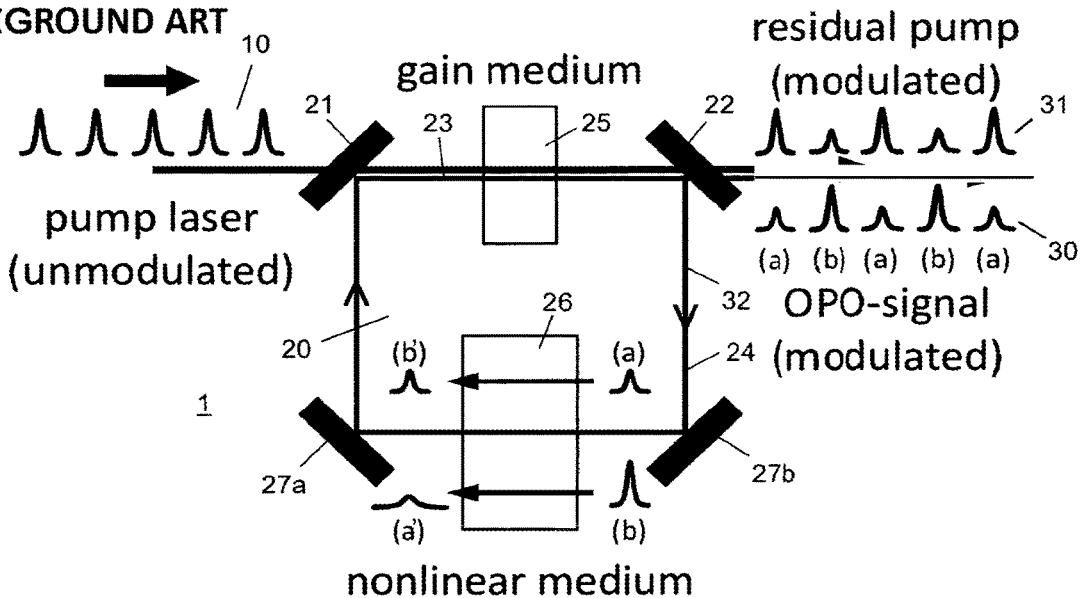
FIG. 1 shows a schematic illustration of a conventional optical parametric oscillator for the provision of a high-frequency modulated light pulse.

FIG. 1 shows a schematic representation of a conventional OPO 1 for the provision of high-frequency modulated light pulses. Pump light pulses 10 are provided by a point light source not illustrated in FIG. 1, which can be designed e.g. as a pulsed laser. The pump light pulses 10 are not modulated and for this reason, their amplitudes are essentially identical.

The pump light pulses 10 are coupled into an optical resonator 20 of the OPO 1, specifically by way of a coupling element 21. The coupling element 21 can comprise for example a polarizing beam splitter and/or a semitransparent mirror. The coupling element 21 can be designed as a dichroic mirror having a transmissive design for the pump light pulses 10 and a reflective design for a feedback light pulse 32.

After passing through the coupling element 21, the pump light pulses 10 then transverse a first resonator arm 23 of the resonator 20. A frequency conversion medium, also referred to as gain medium 25, is arranged in the first resonator arm 23. The gain medium 25 is designed as an optically non-linear medium, such as it is commonly used in OPOs. In this connection, the frequency conversion can be achieved for example via difference frequency generation or via four-wave mixing. A first portion of the pump light pulses 10 is transformed into at least or exactly two conversion light pulses in the gain medium 25, for example into a signal pulse and an idler pulse. A second portion of the pump light pulses 10 passes through the gain medium 25 without non-linear interaction and exits the gain medium 25 as residual pump light pulse 31. After the interaction with the gain medium 25, the three pulses (that is, the two conversion light pulses and the residual pump light pulse) continue to propagate in the first resonator arm 23 in the direction toward a decoupling element 22. The first resonator arm 23 can extend from the coupling element 21 past the gain medium 25 to the decoupling element 22. The first resonator arm 23 can have a linear design. A share of the pulses present on the inside of the resonator 20 can be decoupled on the decoupling element 22.

According to the OPO shown in FIG. 1, the residual pump light pulse 31 is essentially completely decoupled on the decoupling element 22, in the same manner as one of the two conversion light pulses, for example the idler pulse, is essentially completely decoupled. A share of the other of the two conversion light pulses, that is, e.g. the signal pulse, is in part not decoupled on the decoupling element 22, but deflected into a feedback arm 24 of the resonator 20. The decoupling element 22 can have an adjustable and/or variable design, meaning that the intensity of both the portion of the feedback light pulse 32 to be decoupled as well as deflected is adjustable and/or variable. Alternatively, the decoupling element 22 can also be designed as a fixed component, if the fixed value of the decoupling and deflection is selected analogously. The decoupling coefficient of the decoupling element 22 can have different values for the pulse trains circulating in the resonator 20. The optical resonator 20 is essentially designed in the shape of a rectangle, whereby a deflection mirror is arranged on each of the rectangle's four corners. One of said deflection mirrors is designed as the coupling element 21, while another of the deflection mirrors is designed as the decoupling element 22. The first resonator arm 23 is designed as one of the sides of the rectangle of the resonator 20. The other three sides of the rectangle of the resonator 20 form the feedback arm 24. In general, the feedback arm 24 extends from the decoupling element 22 back to the first resonator arm 23 via a suitable deflector, e.g. back to the coupling element 21. In so doing, a first deflection mirror 27a and a second deflection mirror 27b are envisioned in the OPO illustrated in FIG. 1, in order to guide the pulse coupled into the feedback arm 24 from the decoupling element 22 along the feedback arm 24 toward the coupling element 21. The pulse deflected at the decoupling element 22 in the feedback arm 24, that is, e.g. one of the two conversion light pulses such as the signal pulse, is coupled from the decoupling element into the feedback arm 24 as feedback light pulse 32.

In general, the feedback light pulse 32 consists of a portion of light pulses, which are deflected (e.g. by the decoupling element 22) from the first resonator arm 23 into the feedback arm 24. A feedback medium 26 is arranged in the feedback arm 24 as an optically non-linear medium. The feedback medium is arranged between the first deflection mirror 27a and the second deflection mirror 27b. However, the feedback medium 26 could also be arranged at a different position of the feedback arm 24. The feedback light pulse 32 interacts with the feedback medium 26 in an optically non-linear fashion. The intensity of the interaction is dependent on the amplitude of the feedback light pulse 32. In the OPO shown in FIG. 1, the feedback light pulse 32 passes through the feedback medium 26 from the first deflection mirror 27a in the direction toward the second deflection mirror 27b.

In FIG. 1, a schematic representation of a possible modulation is shown, to which the OPO 1 is adjusted. In a schematic representation of a pulse shape on the right of the feedback medium 26, the feedback light pulse 32 has a medium amplitude, labelled as pulse shape (a) in FIG. 1. When a feedback light pulse having such a medium amplitude (a) passes through the feedback medium 26, it undergoes almost no change and exits the feedback medium as feedback light pulse 32 with the pulse shape shown as (b'). Said pulse shape (b') is shown on the left of the feedback medium 26, and likewise has a medium amplitude and virtually does not differ from the previous amplitude height shown as pulse shape (a) on the right of the feedback medium 26. In the case where the feedback light pulse 32 deflected into the feedback arm 24 has a medium amplitude (a), a feedback light pulse 32 having a medium amplitude (b') will likewise be coupled back into the first resonator arm 23 on the coupling element 21.

The OPO 1 is synchronously pumped. This means that the feedback light pulse 32, which is coupled back, is coupled into the first resonator arm 23 on the coupling element 21 essentially simultaneously with a successive pump light pulse 10. In so doing, the feedback light pulse 32 having the medium amplitude (b') amplifies the pump light pulse 10 and jointly passes through the gain medium 25 with it.

Overall, the output and intensity of the pulse train consisting of the feedback light pulse 32 having a medium amplitude (b') and the successive pump light pulse 10 is greater than the one of a pump light pulse 10 alone. As a result, the non-linear interaction is stronger for the amplified pulse train in the gain medium 25 than for a pump light pulse alone. As well, a greater output ratio of the pump light pulse 10 is transformed in this connection into the two conversion light pulses, that is, e.g. the signal pulse and the idler pulse. In this case, which is illustrated schematically as pulse shape (b) in FIG. 1, the residual pump light pulse 31 exits the resonator 20 with a low amplitude, while a feedback light pulse 32 with a high amplitude (b) is coupled back into the feedback arm 24. This is illustrated schematically on the right of the feedback medium 26, as pulse shape (b) having a high amplitude. As said feedback light pulse with the pulse shape (b) has a higher energy than the feedback light pulse with the medium-sized pulse shape (a), the non-linear optical interaction with the feedback medium 26 is stronger in this case. The large feedback light pulse with the pulse shape (b) is thus transformed into a broadened small feedback light pulse having a pulse shape (a'). In this case, a feedback light pulse having a low amplitude (a') is thus coupled back into the first resonator arm 23 and sent through the gain medium 25 jointly with a successive pump light pulse 10 as pulse train. The pulse train consisting of the feedback light pulse 32 having a low amplitude (a') and the successive pump light pulse 10 has a smaller output and intensity than a pump light pulse 10 combined with a feedback light pulse 32 having a medium amplitude (b'). For this reason, the frequency conversion that takes place in the gain medium 25 is less pronounced in this case. In so doing, a residual pump light pulse having a relatively high amplitude is generated, together with two conversion light pulses having for example a medium amplitude (b).

The corresponding light pulses decoupled on the decoupling element 22 are illustrated schematically as pulse shapes (a) and (b) in FIG. 1 next to the decoupling element 22. Any time the residual pump light pulse 31 has a high amplitude, a modulated light pulse 30 has a low amplitude and vice versa. One of the two conversion light pulses can e.g. be used as modulated light pulse 30, e.g. the light pulse that is also used as feedback light pulse (in the example, this would be signal pulse). The other conversion light pulse can either be discarded or also be decoupled as a modulated light pulse. In this connection, the terms "large" and "small" refer to the peak amplitude of the feedback light pulse, and not necessarily to the total pulse energy. The feedback medium keeps the pulse energy constant for the most part, and changes the pulse shape and the peak amplitude of the feedback light pulse. Said effect also affects the pulse energy of the newly generated and hence the next decoupled and returned light pulse via the gain medium or the amplitude medium, respectively. Insofar, the change of the pulse shape and peak amplitude in the feedback medium transforms the feedback light pulse into a weaker or "modulated" coupled back feedback light pulse.

The modulation adjustment of the OPO 1 is dependent on the power of the pulses circulating in the resonator. Alternatively to the modulation adjustment of the OPO 1 with the resulting pulse shapes (a) and (b) illustrated as an example in FIG. 1, the OPO 1 can also be adjusted to a different modulation. The OPO 1 provides a purely optical modulation of a mode-coupled pulse train. The shown OPO 1 with non-linear feedback enables the amplitude modulation of high-frequency light pulses.

The gain medium 25 can be designed e.g. as a strong non-linear medium with second-order non-vanishing susceptibility, as periodically poled lithium niobate (PPLN) or tantalate (PPLT) in congruent (PPcLN, PPcLT) or stoichiometric form (PPsLN, PPcLT), as orientation-patterned gallium arsenide (OP-GaAs), as orientation-patterned gallium phosphide (OP-GaP) as bulk crystal and/or as waveguide. The gain medium 25 can also be implemented as a FWM (four-wave mixing) material, e.g. in a tapered fiber or a photonic crystal fiber (PCF). The gain medium 25 can at the same time also take over the function of the non-linear feedback medium 26, if the geometry of the resonator 20 is designed analogously. The feedback medium 26 can be designed as non-linear medium with e.g. second-order vanishing susceptibility. The third-order susceptibility, which is non-vanishing in all media, is relevant for the effect of self-phase modulation. Thus, the feedback medium 26 can be designed as a type of optical fiber, waveguide or non-linear crystal. In so doing, almost all known materials can be used for the manufacture of said elements. In a special exemplary embodiment, the feedback medium 26 can be designed as a SMF-28 (telecom optical fiber). In one embodiment, the non-linear feedback medium 26 can be identical to the non-linear gain medium 25.

The OPO 1 enables the modulation of a previously unmodulated signal pulse, in particular a laser signal pulse. In so doing, the OPO 1 concerns for example the modulation of pulse trains of an ultra-short pulsed laser with pulse durations in the femtosecond or picosecond range. The OPO 1 makes it possible to apply a maximum modulation frequency, which corresponds to half the repetition rate, onto a pulse train of ultra-short pulses. In this fashion, pulse trains with several 10 MHz can be modulated for procedures such as for example pump test measurements as well as for microscopic procedures such as the stimulated Raman microscopy or the CARS (coherent anti-Stokes Raman scattering) microscopy. Said frequency range is intrinsically extremely low noise, because the noise is proportional to 1/f. Therefore, the OPO 1 provides modulated pulse trains with excellent signal-to-noise ratios.

The feedback arm 24 can be designed with an adjustable optical length. This way, the optical path length in the feedback arm 24 can be adjusted precisely to the distance between the pump light pulses 10. The feedback medium 26 serves a modulating element, which modulates the feedback light pulse in a passive and purely optical fashion. In order to ideally adjust the involved pulse energies, that is, e.g. to an attractor of the OPO 1, a decoupling coefficient of the decoupling element 22 can be adjustable. The non-linear phase shift of the feedback light pulse in the resonator 20 and hence the intensity and the kind of the non-linear interactions in the two optically non-linear media (feedback medium 26 and gain medium 25) can be adjusted with said adjustment option. By adjusting the pulse powers present in the resonator, the optical effects in the resonator can be adjusted precisely to a desired modulation setting, that is, to a predeterminable modulation of the generated modulated light pulses 30. Thus, the amplitude modulation in the OPO 1 is achieved with a passive element exclusively on the basis of optical effects in a self-regulating, back-coupled system. In so doing, individual components of the OPO 10 can be tuned exactly to one another, such as e.g. the selection of the gain medium 25, a delay in the feedback arm 24, a filtration of individual wavelengths and the selection of the non-linear feedback medium 26. Furthermore, either the decoupling coefficient at the decoupling element is variable and/or adjustable, or the strength of the non-linear interaction in the feedback arm 24 and/or the output of the pump light pulses 10 coupled into the resonator 20.

The resonator 20 of the OPO 1 illustrated in FIG. 1 is designed as a single passage amplifier, in which the pump light pulses 10 only pass through the gain medium 25 a single time (as amplifier medium). In alternative examples, the resonator 20 can also be designed as multi-passage amplifier, in which the pump light pulses are not decoupled at the decoupling element at a rate of essentially 100%, but are in large part coupled back into the first resonator arm and pass through it a plurality of times. Said type of multi-passage amplifier would also comprise a separate feedback arm, in which the feedback light pulse interacts with the feedback medium separately from the pump light pulses. The resonator 20 of the OPO 1 can comprise other elements not illustrated in the figures, such as e.g. a spectral filter (e.g. after the feedback medium 26) and/or dispersive elements (such as a prismatic segment) for dispersion compensation or pulse extension.

Figure 2:
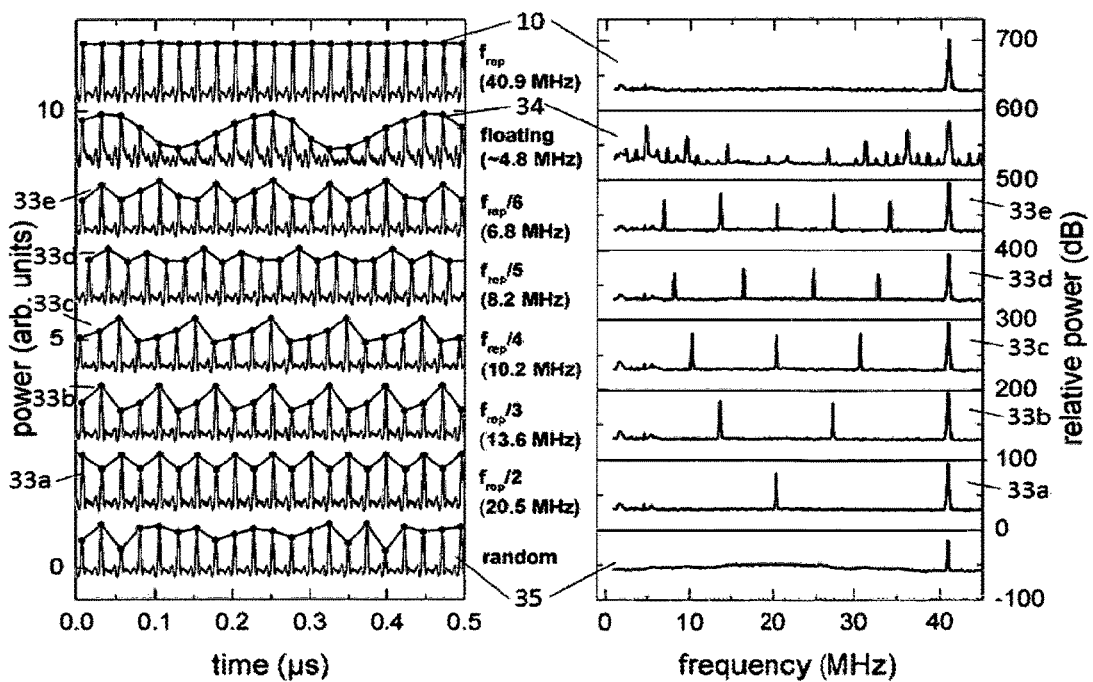
FIG. 2 shows on the left hand side a diagram of a high-frequency pump light pulse for an optical parametric oscillator together with a plurality of high-frequency light pulses modulated by the optical parametric oscillator in the form of pulse trains, and on the right hand side a diagram of the Fourier transforms pertaining to the pulse trains in the frequency domain illustrated on the left hand side.

FIG. 2 shows diagrams of different pulse trains in the OPO 1. On the left hand side of FIG. 2 a diagram of the pulse trains in the time domain and on the right hand side of FIG. 2 a diagram of the Fourier transform of the pulse trains in the frequency domain is shown. The unmodulated pump light pulse 10 is shown at the top left hand side of FIG. 2, while modulated pulse trains 33a to 33e decoupled from the OPO 1 as well as a continuously modulated pulse train 34 and a randomly modulated pulse train 35 are shown underneath. The diagrams on the right hand side of FIG. 2 show the same pulse trains (that is, the pump light pulse 10, the modulated pulse trains 33a to 33e, the continuously modulated pulse train 34 and the randomly modulated pulse train 35) after a Fourier transformation in the frequency domain. In the example illustrated in FIG. 2, the pump light pulses are provided with a repetition frequency of approx. 40.9 MHz, that is, for example with the Yb:KGW laser already mentioned above serving as pump light source. The pump light pulse 10 comprises exactly one frequency, which is clearly and visibly arranged at 40.9 MHz in the Fourier representation depicted on the right hand side in FIG. 2.

The pulse trains 33a to 33e are different pulse trains decoupled from the OPO 1, which are composed of the decoupled modulated light pulses, e.g. the residual pump light pulse and the two conversion light pulses. The modulation of the generated pulse trains is strong, achieved with an integer fraction of the repetition rate of the pump light pulses 10. As a result, different subharmonic components of the repetition rate can be generated as stable states, that is, as attractors, in the OPO 1.

In FIG. 2, pulse train 33a relates to the P2-state of the OPO, pulse train 33b relates to the P3-state of the OPO, pulse train 33c relates to the P4-state of the OPO, pulse train 33d relates to the P5-state of the OPO and pulse train 33e relates to the P6-state of the OPO. It is noted that theoretically there exists an arbitrary number of such PN-states (P2, P3, P4, P5, P6, P7, P8, . . . ), in which the initial pulse form is reproduced only after exactly N cycles. Although stable PN-states with N>10 occur rarely, each of the PN-states, where N is an integer >1, can in principle be used for the present invention.

For the first pulse train 33a, the modulation is generated with half the repetition rate of the pump light pulses 10, and for this reason, a second frequency occurs in the frequency domain at approx. 20.45 MHz aside from the value at approx. 40.9 MHz. The associated first light pulse 33a is clearly depicted with its modulation on the left hand side in FIG. 2. Said modulation adjustment of the first light pulse 33a corresponds to the modulation adjustment having the schematic pulse shapes (a), (b) depicted schematically in FIG. 1. The modulation adjustment to the first light pulse 33a occurs exactly at the time when the output of the pulse trains in the OPO 1 is adjusted to a specific attractor.

A modulation adjustment to a different attractor can result, e.g., in a modulation with one third of the repetition rate, which is depicted as second light pulse 33b in FIG. 2. The third light pulse or pulse train 33c, respectively, is modulated with a frequency of 10.22 MHz corresponding to one fourth of the repetition rate of the pump light pulses, etc. Each of the modulated pulse trains 33a to 33e shown in the FIG. 2 is provided exactly at the time when the OPO 1 is adjusted to a specific attractor. If the OPO is not adjusted to an attractor, this can result e.g. in the continuously modulated pulse train 34 or the randomly modulated pulse train 35, whose intensities can vary randomly. With the continuously modulated pulse train 34, the modulation is not fixed to the repetition rate, but it is close to a non-integral fraction of said rate.

The high-frequency modulated light pulse provided by the OPO 1 refers to a light pulse whose amplitude is modulated regularly, which can e.g. be modulated with an integer fraction of the repetition rate of the pump light pulses. In particular, a modulated pulse train can be provided as the high-frequency modulated light pulse, which (depending on the repetition rate of the pump light pulses) is modulated in the same way as one of the modulated pulse trains 33a to 33e.

Figure 3:
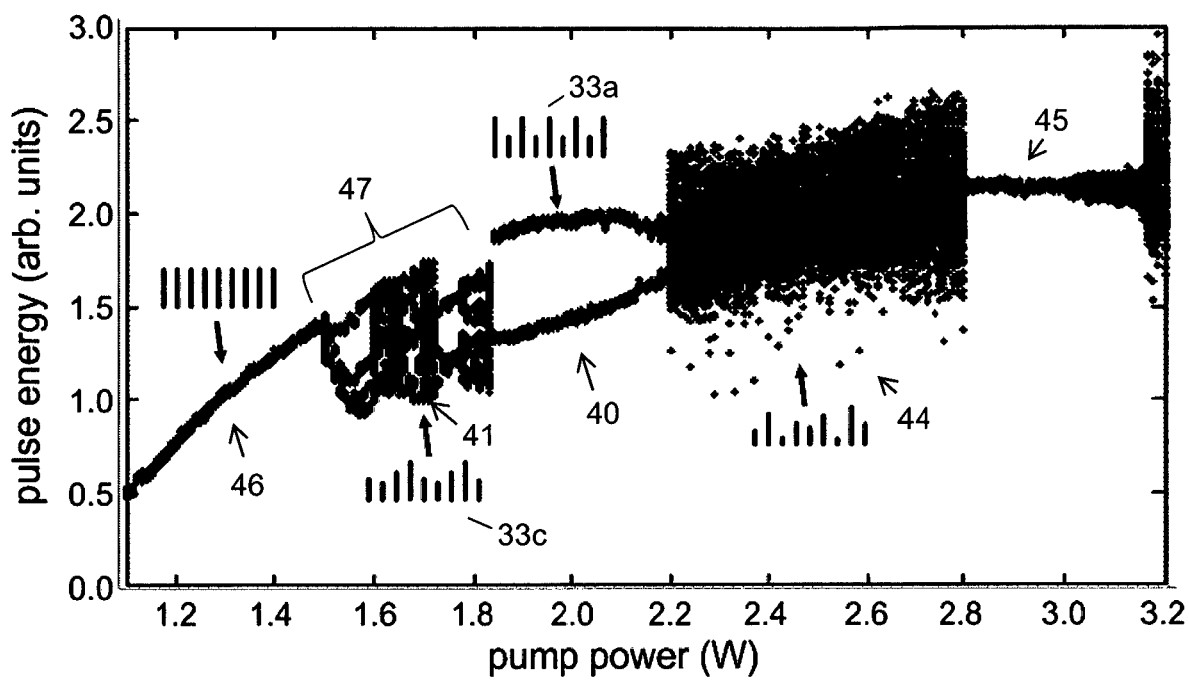
FIG. 3 shows a histogram of bifurcations of pulse trains of an OPO as a function of the pump power of the OPO.

This is illustrated in more detail in FIG. 3 which shows the dependency of the modulation on the pump power of the pump light pulses 10 in a histogram. In general, the pulse power present in the resonator of the optical system should be adjusted accurately, in order to calibrate the system to an attractor. The pulse power can be adjusted for example by regulating the energy of the pump light pulses. In one example, no bifurcation of the intensities of the pump light pulses of a pump power takes place between approx. 1.2 W and approx. 1.5 W. Said range is depicted as a first unmodulated range 46 in FIG. 3. The schematic representation shows that the resulting pulse train does not comprise a modulation, but that the amplitude of all resulting light pulses is equally high. In other words, with a pump power between approx. 1.2 W and approx. 1.5 W, the exemplary OPO is unable to provide a high-frequency modulated light pulse. In a different range of the pump power, that is, for example in a range of approx. 1.9 W to approx. 2.2 W, a bifurcation of the pulse intensities occurs, which is labeled as first attractor 40 in FIG. 3. Said pump power adjustment essentially results in exactly two different heights of amplitudes of the light pulses decoupled from the resonator. This yields the modulation illustrated schematically in FIG. 3, which corresponds to the modulation of the first pulse train 33*a* having half the repetition frequency. Said first attractor 40 is particularly stable, as evidenced by its relatively large capacity range between 1.85 W and 2.2 W. The modulation with half the repetition frequency is maintained in the first attractor 40, even with a mild fluctuation of the pump power.

If the energy is adjusted upward, that is, for example above a pump power of 2.8 W, a second unmodulated range 45 is generated, in which no clearly identifiable modulation occurs in the pulse train.

No attractors are generated in a range between approx. 2.2 W and approx. 2.8 W, but instead relatively unstable and thus irregular modulations in an unstable range labeled with the reference number 44.

A plurality of other attractors of the optical system is present in an attractor range 47 between approx. 1.5 W and approx. 1.85 W. The second attractor 41 of the optical system, which occurs at a pump power of approx. 1.58 W, is clearly labeled. The third pulse train 33*c* from FIG. 2 results from said second attractor. The corresponding pulse train is illustrated schematically on the left hand side of FIG. 2. The remaining attractors depicted in FIG. 2 having the different integral multiples of the repetition rate as modulation frequency can likewise be adjusted in the attractor range 47 with a pump power between approx. 1.5 and 1.85 W. Modulations with modulation frequencies up to one tenth of the repetition frequency were positively demonstrated in experiments. However, said states become increasingly unstable, wherein the first attractor 40 with half the repetition rate has a particularly stable design. Said first attractor 40 having a modulation frequency of half the repetition frequency of the pump light pulses is particularly advantageous for applications. This special state or modulation is also known as "period doubling modulation", "period doubling state" or as period-two-state (P2-state).

Figure 4:
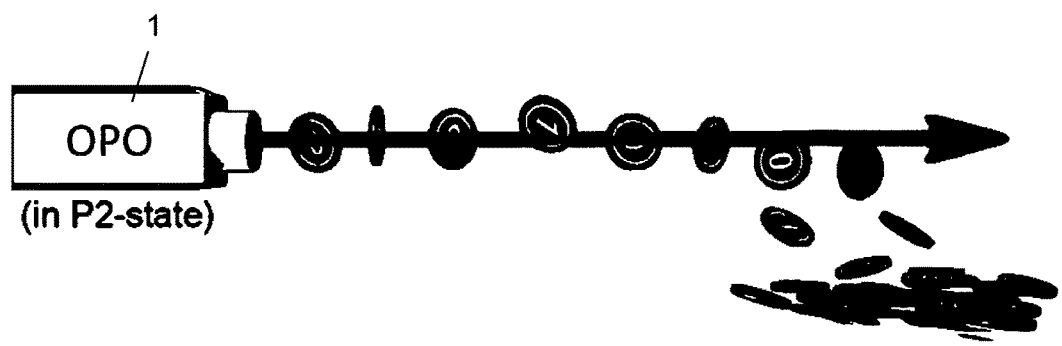
FIG. 4 shows a schematic illustration of using an OPO that operates in a period multiplication state for generating random numbers in accordance with the present invention.
Figure 5:
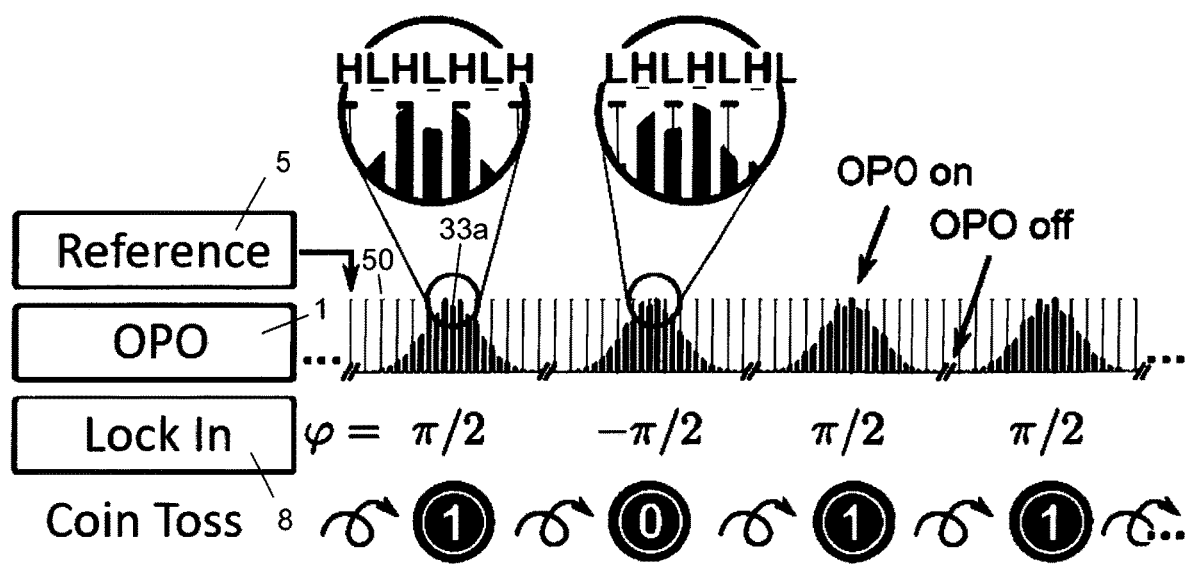
FIG. 5 shows a further schematic illustration of the operation principle of a random number generator according to a preferred embodiment of the present invention.

FIGS. 4 and 5 show schematic illustrations of the operation principle of a random number generator 100 according to an embodiment of the present invention. The random number generator 100 according to the present invention uses an optical parametric oscillator 1 being operated in a period multiplication state (PN-state) for generating at least one random number. In case that the optical parametric oscillator 1 is operated in the P2-state, the bi-stable configuration implemented in such a period-doubling optical parametric oscillator is used for randomness generation. Details of such an OPO 1 and how it can be operated in the period doubling state and other period multiplication states have been described above with respect to FIGS. 1 and 2. In particular, in order to operate the OPO 1 in the period doubling state or other period multiplication states, the OPO 1 has to be pumped by a pump signal 10 having a predetermined pump power that is suitable to bring the OPO 1 into the P2-state or into other PN-states. The involved bi-stability of the P2-state, for example, is equi-energetic and equi-probable.

For the sake of convenience, the invention is exemplarily described in the following by utilizing an OPO that is operated in the P2-state. Accordingly, in the following description, the oscillator output signal is referred to signal 33*a* as shown in FIG. 2. However, as the skilled person would understand, also any other period multiplication state, such as the P3-state, P4-state, P5-state and P6-state with the corresponding oscillator output signal 33*b* to 33*e* of FIG. 2 can in principle be used for carrying out the present invention.

As indicated in FIG. 4, the output of the OPO 1 generates two different output states unambiguously. As further explained below in connection with FIGS. 5 to 6*d*, both outputs are equi-energetic and equi-probable, and are based on the transient oscillation of the OPO 1. The outcomes can be associated to an output bit, comparable to a coin toss. With the OPO operating in the P2-state, only two outcomes are possible and no bias is observed. For randomness generation, the stream of binary outcomes can be used directly, and no additional un-biasing or bit extraction is necessary.

As indicated in FIG. 5, the detection is performed by a phase measurement against an external reference clock, also referred to as reference signal generator 5, which can be supplied by the pump laser (not shown in FIG. 5). In FIG. 5, $\varphi$ denotes the phase of the output signal 33*a* of the OPO, which operates in the period-doubling-state, with respect to a reference signal 50 generated by the reference signal generator 5. Thus, $\varphi$ relates to a relative phase or a phase difference between the output signal 33*a* of the OPO and the reference signal 50. H and L denote the different pulse energy outputs of the OPO 1, wherein H indicates a relatively high energy and L indicates a relatively low energy. As shown in the example of FIG. 5, a Lock-in amplifier is used as a comparing unit or a phase determination unit 8 for determining the phase $\varphi$. Based on the comparison of the output signal 33*a* with the reference signal 50, a random number is generated. In particular, depending on whether the high (H) pulses or the low (L) pulses of the oscillator output signal 33*a* are synchronous or clocked with the pulses of the reference signal 50 a 1-bit ("1") or a 0-bit ("0") is generated as the random number.

Figure 6A:
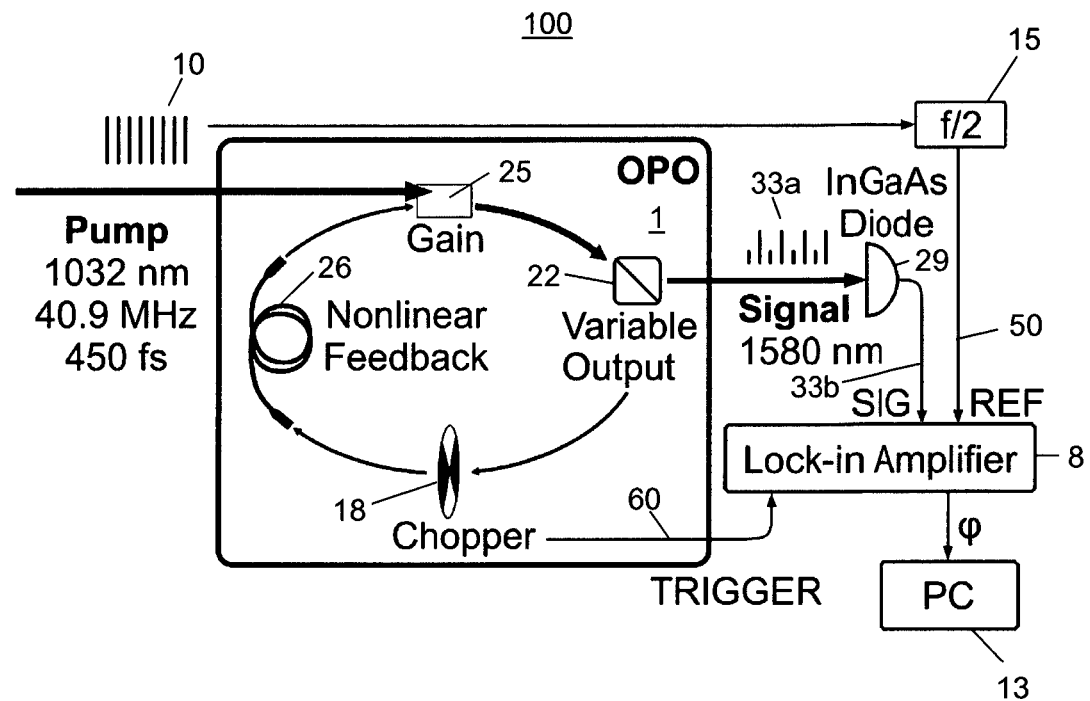
FIG. 6a shows a schematic illustration of a random number generator according to a preferred embodiment of the present invention.

FIG. 6*a* shows a schematic illustration of a random number generator 100 according to a preferred embodiment of the present invention. The random number generator 100 comprises an OPO 1 being pumped by a pump signal 10 with a predetermined pump power and a predetermined pump frequency. The OPO 1 is configured to operate in the period doubling state for providing an oscillator output signal 33*a* of alternating light pulses. In other words, the OPO 1 is adjusted to the first attractor 40, as already described above with respect to FIG. 3. Further, the random number generator 100 comprises a comparing unit 8 that is configured to compare the output signal 33*a* with a reference signal 50. In the embodiment shown in FIG. 6*a*, the comparing unit 8 is a Lock-in amplifier in order to determine the phase of the output signal 33*a* with respect to the reference signal 50. The reference signal 50 has a frequency that is half of the predetermined pump frequency of the pump pulse 10. In order to provide the reference signal 50, a reference signal generator 15 halves the frequency of the pump signal 10. The OPO output signal 33*a*, i.e. the alternating light pulse train, is detected by a photodetector 29 which converts the optical signal into an electrical signal 33b. The phase φ of signal 33b (and thus the phase of the output signal 33a) is determined by the phase determination unit 8 with respect to the reference signal 50. An evaluation unit 13 finally generates at least one random number or at least one random bit based on the comparison of the output signal 33a, 33b with the reference signal 50. In the embodiment shown in FIG. 6a, the evaluation unit 13 is a microprocessor or a computer (PC) that is configured to generate at least one random number based on the determined phase. In particular, the evaluation unit 13 may be configured to generate a 0-bit or a 1-bit depending on whether the determined phase is below or above a threshold value. As illustrated in FIG. 5, the threshold value may be zero. Thus, if the measured phase φ is below this threshold value, e.g. −π/2, a "0" is associated with the output signal 33a. If the measured phase φ is larger than the threshold value, e.g. +π/2, a "1" is associated with the output signal 33a. Accordingly, the random number generator 100 works like a coin toss wherein the randomness is based on vacuum fluctuations that occur in the OPO 1.

The OPO 1 of the random number generator 100 comprises a gain medium 25, a decoupling element 22 and a nonlinear feedback medium 26, the functions of which have already been described above with respect to FIG. 1. Furthermore, the random number generator 100 comprises switching means 18 for switching on and off the OPO 1. In the embodiment shown in FIG. 6a, the switching means 18 is a chopper that is comprised in the resonator of the OPO 1 and that is arranged and configured to interrupt the light pulse within the OPO 1 or the resonator 20 of the OPO 1 (see FIG. 1).

The random number generator 100 further comprises trigger means for providing a trigger signal 20. The trigger signal 20 triggers a measurement of the comparing unit 8, i.e., the comparing unit 8 is configured to compare the oscillator output signal 33a, 33b with the reference signal 50. According to the embodiment shown in FIG. 6a, the trigger means is coupled to the chopper 18. In particular, the switching means or chopper 18 generates the trigger signal and thus comprises or is the trigger means.

According to FIG. 6a, the fiber-feedback OPO 1 is pumped by a mode-locked 450 fs, 1032 nm Yb:KGW oscillator. The gain element 25 is a periodically poled lithium niobate crystal (PPLN). The repetition rate is defined by the pump laser and amounts to 40.9 MHz. The length of the OPO 1 cavity is matched to this by one or more movable mirrors such as elements 21, 22, 27a and/or 27b, shown in FIG. 1 (not shown in the schematics of FIG. 6a). A part of the OPO cavity consists of a single-mode feedback fiber 26, which in combination with the variable output coupler 22 allows to control the effective intracavity non-linearity. The output signal 33a is detected on a reverse-biased InGaAs photo diode 29. The signal 33b is monitored in real time on an oscilloscope (see FIG. 6c). Alternatively, as illustrated in FIG. 6a, the signal 33b is fed into a lock-in amplifier 8 for further analysis.

Figure 6B:
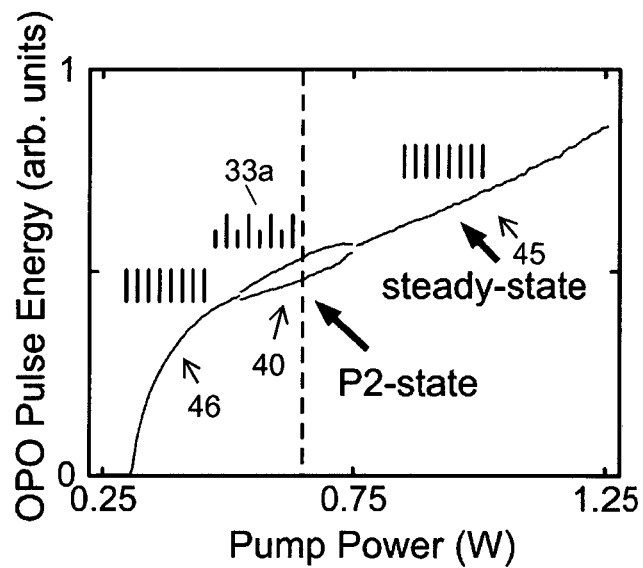
FIG. 6b shows a diagram of the output pulse energy of the OPO comprised in the random number generator of FIG. 6a in dependence of the pump power.

As shown in FIG. 6b, when the pump power is varied, the OPO 1 exhibits a bi-modal behavior, which can be identified as period doubling or as the P2-state. Above its oscillation threshold (approx. 0.3 W according to the example of FIG. 6b) the OPO 1 operates in the steady-state 46, which results in an output pulse train with identical subsequent pulses that relate to the pump pulses 10, as known from any mode-locked laser. Upon further increase of pump power (to approx. 0.5 W according to the example of FIG. 6b), the system enters the so-called period-2-state (P2-state) which delivers alternating pulses 33a with different pulse energy, peak power, and spectral properties. This behavior originates from the interplay of spectral selective gain and nonlinear feedback. As a result of the synchronous pumping of the OPO 1, these pulses are temporally aligned with the pump frequency. It is noted that both different output pulse train options of the output signal, i.e. HLHL . . . and LHLH . . . , are equi-energetic.

When the pump frequency (40.9 MHz in this example) is electronically divided by two, the pulse-train 33a in the P2-state has a defined phase against this derived reference signal 50. When the OPO 1 is turned on, this phase may be either in phase, or, with 50% probability, out of phase. This phase difference of π can be unambiguously measured with various demodulation techniques. A simple and convenient way is the relative multiplication between the detected signal 33a, 33b and the reference signal 50. A simple commercial solution is the detection with a Lock-in amplifier 8, which allows for a direct access to the relative phase φ. The measurement time to determine the phase amounts to 1 µs. For random number generation, the OPO 1 is turned on and off by the optical chopper 18, which is installed such that it can inhibit the cavity oscillation.

Figure 6C:
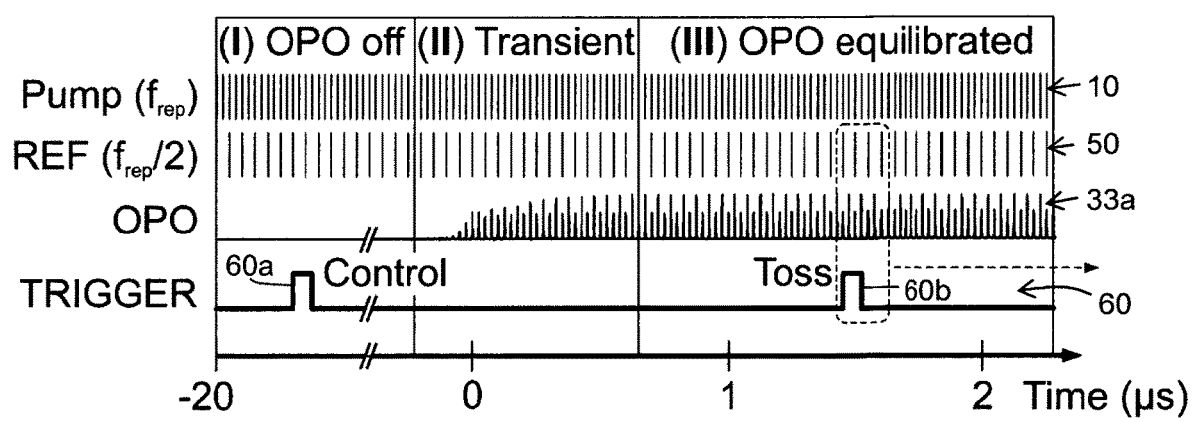

FIG. 6c shows the sequence of generating one single bit in the random number generator 100. In region (I) the OPO is off. In region (II) the OPO is switched on, for example by means of the chopper 18. After having switched on the OPO, a transient process occurs until (after approx. 0.5 µs) the OPO operates in the equilibrated P2-state, as indicated by region (III). The output signal 33a is measured versus the reference signal (REF) 50, which corresponds to half of the repetition rate of the pump laser ($f_{rep}$). This measurement is performed twice in one chopper cycle: When the OPO is off or blocked—as the control signal—and when the OPO operates in the P2-state—as the signal of the running oscillator, the tossed and landed coin. The control measurement is performed to verify that two subsequent measurements do not carry spurious information from one to the next outcome.

The trigger and/or switching means 18 is configured to provide an on-state trigger signal 60b during an on-state of the OPO, wherein the on-state of the OPO relates to the equilibrated period doubling state of the OPO (region III in FIG. 6c). Thus, the on-state trigger signal 60b triggers a toss measurement by comparing the oscillator output signal 33a with the reference signal 50 upon having switched on the OPO and upon the OPO operates in the P2-state. Further, the trigger and/or switching means 18 is configured to provide an off-state trigger signal 60a during an off-state of the OPO 1. The off-state trigger signal 60a triggers a control measurement by comparing the oscillator output signal 33a with the reference signal 50 upon having switched off the OPO, i.e., when the chopper 18 inhibits a light pulse oscillation within the OPO (region I in FIG. 6c).

Figure 6D:
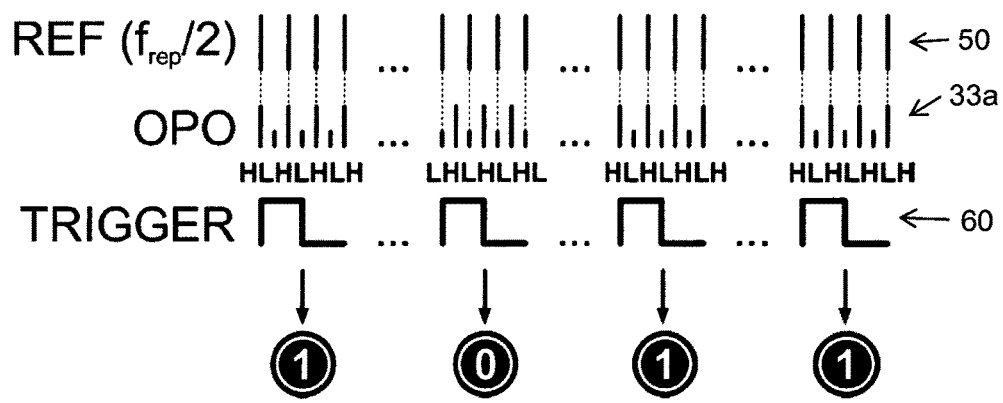
FIG. 6d shows a schematic illustration of an interpretation of the measurement results as binary random numbers by a comparison of the equilibrated P2-state of the OPO with the reference signal.

A sequence of four consecutive measurements in the on-state is depicted in FIG. 6d. H and L denote the two alternating, high and low pulse energy outputs of the OPO in the P2-state, respectively. The measurement outcome can be saved, e.g. by a Matlab script, into a comprehensive set of data, which saves all measured phases. These can be either analyzed as direct phases, or alternatively processed as bit outcomes. The measured phase of the oscillating OPO exhibits essentially two measurement outcomes: −π/2 and +π/2. By means of a simple threshold the measurements are selected into a binary outcome. Values above zero phase are associated with the outcome "1", whereas values below zero are assigned a value of "0". Equally, these outcomes are the two possible stable configurations of the P2-state, LHLH ... (0) or HLHL ... (1), where the order is fixed by the reference signal 50, at half of the pump frequency (see FIG. 6d). As illustrated in the example of FIG. 6d, only the first, third, fifths, etc., pulse of the output signal 33a coincides with the pulses of the reference signal 50. The second, fourth, sixth, etc., pulse of the output signal 33a does not coincide with the pulses of the reference signal 50. The pulses of the output signal 33a that do not coincide with the pulses of the reference signal 50 correspond to the underlined character in FIG. 5. Thus, generating at least one random number comprises generating a 1-bit or a 0-bit depending on whether the high (H) pulses or the low (L) pulses of the oscillator output signal 33a are synchronous with pulses of the reference signal 50. Accordingly, as illustrated in the example of FIG. 6d, in case the high (H) pulses of the oscillator output signal 33a are synchronous with pulses of the reference signal 50, a "1" is generated and in case the low (L) pulses of the oscillator output signal 33a are synchronous with pulses of the reference signal 50, a "0" is generated.

Within the present invention, $2.25 \times 10^8$ measurement results were plotted in a histogram for the case that the OPO is in an off-state and for the case that the OPO is in an on-state (P2-state). It turned out that essentially all different phases can be randomly measured for the OPO being in the off-state, while for the OPO being in the off-state a very narrow distribution around the estimated values, namely $\varphi=-\pi/2$ and $\varphi=+\pi/2$, can be verified. Also, it turned out that the probability of measured $\varphi=-\pi/2$ phase differences is essentially equal to the probability of measured $\varphi=+\pi/2$ phase differences.

Within the present invention, an "all-optical" randomness generation has been described, in which the random process is independent of a particular detector implementation. In particular, a purely optical randomness generator 100, based on the bi-stable output of an optical parametric oscillator 1 is provided. Detector noise plays no role and post-processing is reduced to a minimum. Upon entering the bi-stable regime, initially the resulting output phase depends on vacuum fluctuations. Later, the phase is rigidly locked and can be well determined versus a pulse train, which is derived from the pump laser. This delivers an ambiguity-free output, which is reliably detected and associated with a binary outcome. The involved bi-stability is equi-energetic and equi-probable. Only two outcomes are possible and no bias is observed. For randomness generation, the stream of binary outcomes can be used directly, and no additional un-biasing or bit extraction is required.

Concerning the origin of randomness of the random number generator according to the present invention, it is noted that the randomness element in the transient process of a starting OPO originates from quantum effects. These include vacuum fluctuations in the gain element as well as cavity losses. The primary quantum process in the build-up of the oscillation is the generation of single photons in a spontaneous down conversion process caused by pumping the non-linear gain crystal. The exact contribution of these processes to the formation of the P2-state is currently under investigation. In the context of randomness generation, it is important to note that the period doubling attractor is in particular not a chaotic attractor. Further, the independence of the primary randomness process against small fluctuations of the pump power is a crucial feature. In order to demonstrate this peculiarity, the inventors have performed numerical pulse propagation simulations (RP Pro Pulse from RP Photonics) of the transient process with an artificially fixed additional seed. These show that a relative intensity change of more than ±1% is required to induce a phase change by $\pi$ in the measured outcome. However, the measured relative intensity noise integrated from 10 kHz to 20 MHz amounts to ±0.0215% and is thus approximately a factor of 50 too low to be the relevant driver of the randomness generation. Moreover, the independence of subsequent measurement outcomes is important, as discussed on the observed bits below. Therefore, the inter-bit waiting time was reduced in an additional experiment by a factor of 1000. This was performed with the OPO operated in an extended cavity configuration, such that four independent pulses oscillate simultaneously in the cavity. A subsequent measurement reads four bits within a single chopper cycle. This reduces the relevant timescale for the comparison of successive bits from 100 µs to 100 ns and thus eliminates the contribution of mechanical vibrations, chopper jitter, thermal effects, and pump intensity noise. Nevertheless, alternating bits have been measured, which would not be the case if any of the above technical effects would cause the randomness. Thus, these investigations indicate that quantum effects are a significant source of randomness in the random number generated according to the present invention.

From experiments and analysis carried out by the inventors, such as performing and evaluating $2 \times 2.25 \times 10^8$ measurements of the phase $\varphi$ of the OPO both in the on- and off-state of the OPO, performing common random number tests and investigating the generated entropy, it can be concluded that the measured raw bits of the presented all-optical randomness generator using a nonlinear feedback OPO in the P2-state do not differ by any measurable means from the ones of a perfect coin toss or Bernoulli trial. In particular, this is indicated by the independence of consecutive measurement outcomes, the balance between the two probabilities, and further tests, which resemble the expected outcomes of a perfect coin toss. The random nature of the generated binary outcome could be confirmed by the inventors by an analysis of resulting conditional entropies. Hence, by the present invention, the required post-processing can be reduced to a minimum. Such a post-processing would generally be required for any physical implementation of a fair (perfect) coin-toss due to finite size effects.

In summary, the apparatus and method according to a preferred embodiment of the present invention is based on the bi-stable outcome of an optical parametric oscillator with nonlinear fiber feedback, operating in the P2-state. The detection scheme relies on phase detection versus an external reference pulse. This implementation is substantially simpler than prior published experiments, since it does not require degenerate operation of the OPO. The disadvantage of degenerate operation is that it necessitates either an actively interferometrically stabilized resonator to fix the relative optical phases of the signal and idler frequency combs to the pump frequency comb, or a "shaker" using a "dither and lock" algorithm that periodically varies the cavity length to generate an error signal for the stabilization. This introduces noise to the system which can be avoided by a non-degenerate operation. The implemented detection scheme, based on period doubling, is ambiguity free, i.e. has only two possible outcomes, separated by more than 400 standard deviations, which can be interpreted as zeros and ones of a random bit sequence. This uniquely decouples the fundamental randomness process from the detection principle. The sample rate is ultimately limited by the transient process until the OPO is in a stable state and by the required time for phase detection. As evident in FIG. 6c, the time for equilibration can be estimated to approximately 300 ns and the ambiguity-free detection of the phase state to two to three cycles, amounting to 100-150 ns. With the described OPO, and by introducing a fast chopper, a random bit rate above 1 MHz can be reached. An even further speed-up can be implemented with a higher repetition rate of the pump laser. For such changes, OPOs reaching the GHz range may be used. As a side-effect, this would result in a much more compact design for the entire experimental configuration. Building a more compact randomness generator could further be realized by implementing the inventive principle with state-of-the-art technology on a photonic chip.

LIST OF REFERENCE NUMERALS

1 Optical parametric oscillator (OPO)
5 Reference signal generator
8 Comparing unit/Phase determination unit
10 Pump light pulse
13 Evaluation unit/Computer
15 Reference signal generator/Frequency divider
18 Switching means/Chopper
20 Resonator/Cavity
21 Coupling element
22 Decoupling element
23 First resonator arm
24 Feedback arm
25 Frequency conversion medium/Gain medium
26 Feedback medium
27a First deflection mirror
27b Second deflection mirror
29 Optical detector/Photodetector/Photodiode
30 Modulated light pulse
31 Residual pump light pulse
32 Feedback light pulse
33a Output signal (pulse train) of the OPO in the P2-state
33b Output signal (pulse train) of the OPO in the P3-state
33c Output signal (pulse train) of the OPO in the P4-state
33d Output signal (pulse train) of the OPO in the P5-state
33e Output signal (pulse train) of the OPO in the P6-state
34 Continuously modulated pulse train
35 Randomly modulated pulse train
40 First attractor (relating to the P2-state)
41 Second attractor
44 Unstable range
45 Second unmodulated range/Steady state
46 First unmodulated range
47 Attractor range
50 Reference signal
60 Trigger signal
60a Off-state trigger signal
60b On-state trigger signal
100 Random number generator
N Integer >1
φ Phase/Relative phase/Phase difference
L Low pulse
H High pulse

The invention claimed is:

1. An apparatus for generating at least one random number, comprising:
an optical parametric oscillator being pumped by a pump signal with a predetermined pump power and a predetermined pump frequency, the optical parametric oscillator being configured to operate in a period multiplication state for providing an oscillator output signal of light pulses with alternating pulse energy, the oscillator output signal having a period that is N-times the period of the pump signal, where N is an integer and N>1;
a comparing unit being configured to compare the output signal with a reference signal, wherein the reference signal has a frequency that is 1/N of the predetermined pump frequency; and
an evaluation unit being configured to generate the at least one random number based on the comparison of the output signal with the reference signal.

2. The apparatus according to claim 1, wherein
the comparing unit comprises a phase determination unit being configured to determine a phase (φ) of the oscillator output signal with respect to the reference signal, and
the evaluation unit is configured to generate the at least one random number based on the determined phase (φ).

3. The apparatus according to claim 2, wherein the evaluation unit is preferably configured to generate a 0-bit or a 1-bit depending on whether the determined phase (φ) is below or above a threshold value.

4. The apparatus according to claim 1, wherein the oscillator output signal is a pulse train of alternating high (H) and low (L) pulses, and wherein the evaluation unit is configured to generate a 1-bit or a 0-bit depending on whether the high (H) pulses or the low (L) pulses of the oscillator output signal are synchronous with pulses of the reference signal.

5. The apparatus according to claim 1, further comprising a switching unit configured to switch on and off the optical parametric oscillator, wherein the switching unit is in a resonator of the optical parametric oscillator, and/or wherein the switching unit is configured to inhibit a light pulse oscillation within the resonator of the optical parametric oscillator.

6. The apparatus according to claim 5, further comprising a trigger unit for providing a trigger signal, wherein the comparing unit is configured to compare the oscillator output signal with the reference signal in response to the trigger signal.

7. The apparatus according to claim 6, wherein the trigger unit is configured to provide an on-state trigger signal during an on-state of the optical parametric oscillator, wherein the on-state of the optical parametric oscillator relates to the period multiplication state of the optical parametric oscillator.

8. The apparatus according to claim 6, wherein the trigger unit is configured to provide an off-state trigger signal during an off-state of the optical parametric oscillator.

9. The apparatus according to claim 6, wherein the trigger unit is coupled to the switching unit.

10. The apparatus according to claim 5, wherein the switching unit is an optical switching unit.

11. The apparatus according to claim 1, wherein the apparatus further comprises a reference signal generator configured to provide the reference signal.

12. The apparatus according to claim 11, wherein the reference signal is based on the pump signal.

13. The apparatus according to claim 11, wherein the apparatus is configured such that a plurality of random numbers can be generated simultaneously by using a temporal multiplexing and/or a spectral multiplexing.

14. A method for generating at least one random number, comprising the steps of:
providing an optical parametric oscillator being pumped by a pump signal with a predetermined pump power and a predetermined pump frequency, the optical parametric oscillator being configured to operate in a period multiplication state for providing an oscillator output signal of light pulses with alternating pulse energy, the oscillator output signal having a period that is N-times the period of the pump signal, where N is an integer and N>1;

operating the optical parametric oscillator in the period multiplication state;

comparing the oscillator output signal with a reference signal, wherein the reference signal has a frequency that is 1/N of the predetermined pump frequency; and generating the at least one random number based on the comparison of the oscillator output signal with the reference signal.

15. The method according to claim 14, wherein the step of comparing the oscillator output signal with the reference signal comprises determining a phase ($\varphi$) of the oscillator output signal with respect to the reference signal, wherein the at least one random number is generated based on the determined phase ($\varphi$), and wherein generating the at least one random number preferably comprises generating a 0-bit or a 1-bit depending on whether the determined phase ($\varphi$) is below or above a threshold value.

16. The method according to claim 14, wherein the oscillator output signal is a pulse train of alternating high (H) and low (L) pulses, and wherein generating the at least one random number comprises generating a 1-bit or a 0-bit depending on whether the high (H) pulses or the low (L) pulses of the oscillator output signal are synchronous with pulses of the reference signal.

17. The method according to claim 14, further comprising the step of:
switching on the optical parametric oscillator and performing at least one toss measurement by comparing the oscillator output signal with the reference signal upon having switched on the optical parametric oscillator.

18. The method according to claim 14, further comprising the step of:
switching off the optical parametric oscillator and performing at least one control measurement by comparing the oscillator output signal with the reference signal upon having switched off the optical parametric oscillator.

19. The method according to claim 14, further comprising the steps of:
switching on and off the optical parametric oscillator for a predetermined number of times;
performing a corresponding number of toss measurements by comparing the oscillator output signal with the reference signal upon each switching-on step; and
generating a corresponding number of random numbers based on the comparisons of the oscillator output signal with the reference signal.

20. A method for generating at least one random number, the method comprising:
operating an optical parametric oscillator in a period multiplication state for providing an oscillator output signal of light pulses with alternating pulse energy; and
generating the at least one random number based on the oscillator output signal.

* * * * *

UNITED STATES PATENT AND TRADEMARK OFFICE
CERTIFICATE OF CORRECTION

| | | |
|---|---|---|
| PATENT NO. | : 11,526,331 B2 | Page 1 of 1 |
| APPLICATION NO. | : 16/760290 | |
| DATED | : December 13, 2022 | |
| INVENTOR(S) | : Steinle et al. | |

It is certified that error appears in the above-identified patent and that said Letters Patent is hereby corrected as shown below:

On the Title Page

Item (71):
"UNIVERSITAT STUTTGART" corrected to --UNIVERSITÄT STUTTGART--.

Item (72):
"Zurich" corrected to --Zürich--.

Item (73):
"UNIVERSITAT STUTTGART" corrected to --UNIVERSITÄT STUTTGART--.

Signed and Sealed this
Twenty-seventh Day of August, 2024

Katherine Kelly Vidal
*Director of the United States Patent and Trademark Office*